US012573736B2

(12) United States Patent
Stace et al.

(10) Patent No.: US 12,573,736 B2
(45) Date of Patent: Mar. 10, 2026

(54) MICROWAVE CIRCULATOR

(71) Applicant: ANALOG QUANTUM CIRCUITS PTY LIMITED, Brisbane (AU)

(72) Inventors: Thomas Michael Stace, St Lucia (AU); Arkady Fedorov, St Lucia (AU)

(73) Assignee: THE UNIVERSITY OF QUEENSLAND, Queensland (AU)

( * ) Notice: Subject to any disclaimer, the term of this patent is extended or adjusted under 35 U.S.C. 154(b) by 220 days.

(21) Appl. No.: 18/547,250

(22) PCT Filed: Feb. 23, 2022

(86) PCT No.: PCT/AU2022/050139
§ 371 (c)(1),
(2) Date: Aug. 21, 2023

(87) PCT Pub. No.: WO2022/178577
PCT Pub. Date: Sep. 1, 2022

(65) Prior Publication Data

US 2024/0304972 A1 Sep. 12, 2024

(30) Foreign Application Priority Data

Feb. 23, 2021 (AU) ................................ 2021900479

(51) Int. Cl.
*H01P 1/397* (2006.01)
*H01P 1/38* (2006.01)
*H01P 11/00* (2006.01)

(52) U.S. Cl.
CPC ................ *H01P 1/397* (2013.01); *H01P 1/38* (2013.01); *H01P 11/00* (2013.01)

(58) Field of Classification Search
CPC .... H01P 1/397; H01P 1/38; H01P 1/32; H01P 1/387; H01P 1/36; H01P 1/383
See application file for complete search history.

(56) References Cited

U.S. PATENT DOCUMENTS

| | | | |
|---|---|---|---|
| 6,365,912 B1 | 4/2002 | Booth et al. |
| 6,528,814 B1 | 3/2003 | Frank et al. |
| 2018/0040935 A1 | 2/2018 | Sliwa et al. |

FOREIGN PATENT DOCUMENTS

| | | |
|---|---|---|
| JP | 2004111751 A | 4/2004 |
| WO | 2019195881 A1 | 10/2019 |

OTHER PUBLICATIONS

International Search Report for PCT/AU2022/050139, mailed Apr. 19, 2022, 4 pages.

(Continued)

*Primary Examiner* — Stephen E. Jones
(74) *Attorney, Agent, or Firm* — Nixon & Vanderhye, PC

(57) ABSTRACT

A microwave circulator including an integrated circuit and having a number of ports, a respective superconducting ring segment coupled to each port to allow microwave frequency signals to be transferred between the port and the respective ring segment, a superconducting tunnel junction interconnecting each pair of adjacent ring segments to form a circulator ring, wherein the tunnel junctions are configured so that when a bias is applied to the tunnel junctions, signals undergo a phase shift as they traverse the tunnel junctions between ring segments, thereby propagating signals to an adjacent port in a propagation direction and at least one feature to at least partially suppress quasiparticles within the circulator.

11 Claims, 11 Drawing Sheets

(56) References Cited

OTHER PUBLICATIONS

Written Opinion of the ISA for PCT/AU2022/050139, mailed Apr. 19, 2022, 5 pages.

Henriques, Fabio et al. (2019). Phonon traps reduce the quasiparticle density in superconducting circuits. Applied Physics Letters. 115(21 ).

Aumentado, Jet al. (2004). Nonequilibrium Quasiparticles and 2e Periodicity in SingleCooper-Pair Transistors. Physical review letters. 92(6).

Riwar, Roman-Pascal and Catelani, Gianluigi. (2019). Efficient quasiparticle traps with low dissipation through gap engineering. Physical Review B. 100.

Joyez, P et al. (1994 ). Observation of parity-induced suppression of Josephson tunneling in the superconducting single electron transistor. Physical review letters. 72(15). 2458-2461. p. 2458 col. I.

Grand LE J Bet al: "Superconductive Tunneljunctions for X-Ray Spectroscopy", IEEE Transactions on Applied Superconductivity, IEEE, USA, 2 University of Twente, faculty of Applied Physics, Low Temperature Group, Mar. 1, 1993 (Mar. 1, 1993), pp. 2070-2075, XP000518118, ISSN: 1051-8223, DOI: 10.1109/77.233449 * the whole document *.

Pekola J p et al: "Trapping of quasiparticles of a nonequilibrium superconductor", Applied Physics Letters, American Institute of Physics, 2 Huntington Quadrangle, Melville, NY 11747, vol. 76, No. 19, May 8, 2000 (May 8, 2000), pp. 2782-2784, XP012025249, ISSN: 0003-6951, DOI: 10.1063/1.126474 * p. 2782-p. 2783; figures 1,2.

Extended European Search Report for Application No. 22758630.2 dated Feb. 1, 2025, 11 pages.

MICROWAVE CIRCULATOR

This application is the U.S. national phase of International Application No. PCT/AU2022/050139 filed Feb. 23, 2022, which designated the U.S. and claims priority to AU patent application No. 2021900479 filed Feb. 23, 2021, the entire contents of each of which are hereby incorporated by reference.)

BACKGROUND OF THE INVENTION

The present invention relates to a microwave circulator, and in particular an on-chip microwave circulator.

DESCRIPTION OF THE PRIOR ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

A microwave circulator is a non-reciprocal multi-port device, in which a microwave or radio frequency signal entering any port is transmitted to the next port in rotation (only). A port in this context is a point where an external waveguide or transmission line (such as a microstrip line or a coaxial cable), connects to the device. Thus, for a three-port circulator, a signal applied to port 1 only comes out of port 2; a signal applied to port 2 only comes out of port 3; a signal applied to port 3 only comes out of port 1.

Microwave circulators are ubiquitous in experiments on superconducting quantum circuits. They are used for routing signals, and to isolate the sensitive quantum devices from the relatively noisy control and readout circuitry. Commercially available circulators are wave-interference devices based on the Faraday effect, which requires relatively strong permanent magnets to break time-reversal symmetry. Their size and the necessary strong magnetic fields both make them unsuited to large-scale integration with superconducting circuits, generating a major bottleneck for the further scaling-up of superconducting quantum technology.

Recent work has seen a number of proposals to overcome these challenges. Many are based on non-linear mixing phenomena, or an engineered interplay of driving and dissipation. This class of circuits usually require additional radio or microwave frequency circuits and rely on careful engineering of phase relations between several input and drive fields.

"A passive on-chip, superconducting circulator using rings of tunnel junctions" by Clemens Müller, Shengwei Guan, Nicolas Vogt, Jared H. Cole, Thomas M. Stace, 28 Sep. 2017 arXiv:1709.09826 describes a passive, on-chip microwave circulator based on a ring of superconducting tunnel junctions. A constant bias is applied to the centre of the ring to provide the symmetry breaking magnetic field. The design provides high isolation even when taking into account fabrication imperfections and environmentally induced bias perturbations and has a bandwidth in excess of 500 MHz for realistic device parameters.

WO2019/195881 describes a microwave circulator including an integrated circuit having a number of ports and a respective ring segment coupled to each port to allow microwave frequency signals to be transferred between the port and the respective ring segment. The circulator includes multiple respective ring segments arranged to define multiple parallel circulator ring and at least one superconducting tunnel junction interconnecting each pair of adjacent ring segments and/or a plurality of superconducting tunnel junctions interconnecting each pair of adjacent ring segments to form a circulator ring. The ring segments are configured so that when a bias is applied to the tunnel junctions, signals undergo a phase shift as they traverse the tunnel junctions between ring segments, thereby propagating signals to an adjacent port in a propagation direction.

Operation of such microwave circulators is strongly dependent on the external charge and flux biases, the driving frequency, as well as fabrication imperfections of the device. Good circulator performance thus requires precise control of these external parameters and of device fabrication disorders, and any perturbation in the device could in turn lead to the external parameters being incorrect, hence adversely affecting the device operation.

SUMMARY OF THE PRESENT INVENTION

In one broad form, an aspect of the present invention seeks to provide a microwave circulator including an integrated circuit and having: a number of ports; a respective superconducting ring segment coupled to each port to allow microwave frequency signals to be transferred between the port and the respective ring segment; a superconducting tunnel junction interconnecting each pair of adjacent ring segments to form a circulator ring, wherein the tunnel junctions are configured so that when a bias is applied to the tunnel junctions, signals undergo a phase shift as they traverse the tunnel junctions between ring segments, thereby propagating signals to an adjacent port in a propagation direction; and, at least one feature to at least partially suppress quasiparticles within the circulator.

In one embodiment the at least one feature includes at least one of: at least one quasiparticle trap; and, a quasiparticle trap in each ring segment.

In one embodiment the quasiparticle trap includes a trap superconducting material having a lower energy gap than the ring segments.

In one embodiment trap superconducting material is deposited on each of the ring segments.

In one embodiment the at least one feature includes gap engineering of one or more of the tunnel junctions.

In one embodiment each tunnel junction includes superconducting electrodes separated by a tunnelling barrier, and wherein at least one of: the electrodes have different thicknesses; and, the electrodes are made of different superconducting materials.

In one embodiment at least one of: the propagation direction is dependent on at least one of a magnitude and polarity of the bias; propagation is controlled by adjusting at least one of a magnitude and polarity of the bias; and, propagation is controlled so that circulator acts as at least one of: a switch; an isolator; a duplexer; a filter; and, an attenuator.

In one embodiment the bias includes: a central bias applied to all of the tunnel junctions; and, a segment bias applied to tunnel junctions between each ring segment.

In one embodiment the bias includes: a central bias generated by applying a magnetic field to the ring; and, a segment bias generated by applying a bias voltage to each ring segment.

In one embodiment each port is capacitively coupled to a respective ring segment.

In one embodiment the tunnel junctions are Josephson junctions.

In one embodiment the integrated circuit includes: a substrate; a first superconducting material deposited on the substrate that is to form a lower electrode of each junction; an insulating layer provided on at least part of the first conductive material that forms tunnelling barrier of the junctions; and, a second superconducting material deposited on the insulating layer and spanning adjacent lower electrodes to form counter electrodes of each junction.

In one embodiment at least one of: the superconducting layers are made of at least one of: niobium; and, aluminium; and, the insulating layer is made of aluminium oxide.

In one embodiment the circulator includes at least three ports and three ring segments.

It will be appreciated that the broad forms of the invention and their respective features can be used in conjunction and/or independently, and reference to separate broad forms is not intended to be limiting. Furthermore, it will be appreciated that features of the method can be performed using the system or apparatus and that features of the system or apparatus can be implemented using the method.

BRIEF DESCRIPTION OF THE DRAWINGS

One or more examples of the present invention will now be described with reference to the accompanying drawings, in which:—

DETAILED DESCRIPTION OF THE PREFERRED EMBODIMENTS

Figure 1:
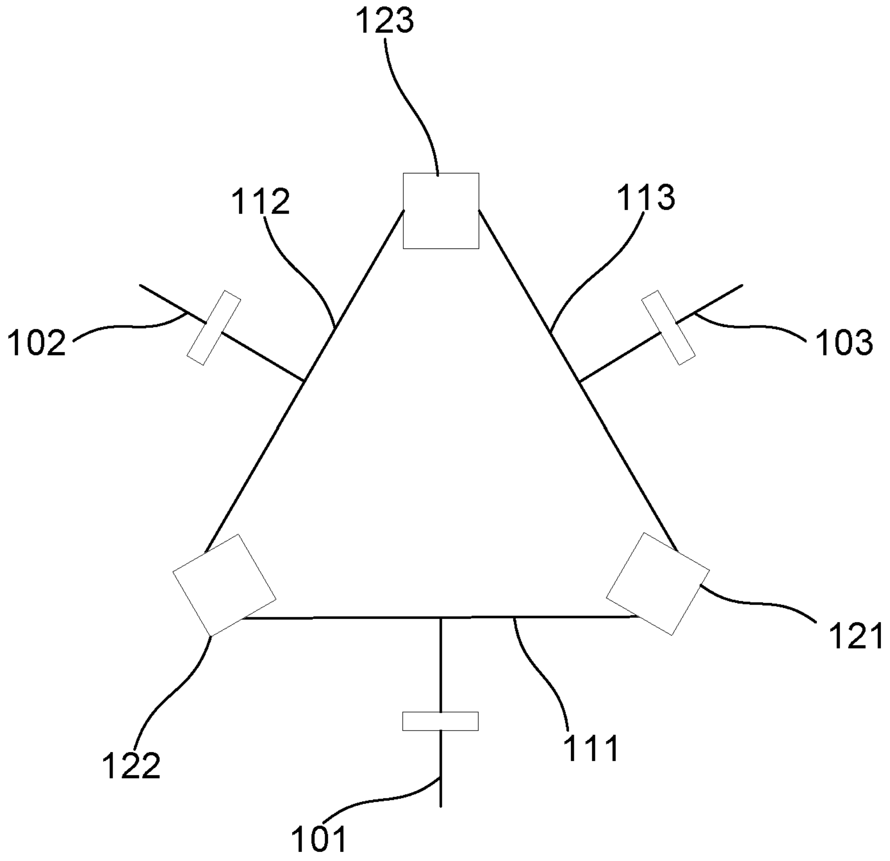
FIG. 1 is a schematic diagram of an example of a microwave circulator.

An example of a microwave circulator will now be described with reference to FIG. 1.

In this example, the microwave circulator is formed on an integrated circuit and includes a number of ports 101, 102, 103 with each port 101, 102, 103 being coupled to a respective ring segment 111, 112, 113. The ports 101, 102, 103 are coupled to the ring segments 111, 112, 113 to allow microwave frequency signals to be transferred between the port 101, 102, 103 and the respective ring segment 111, 112, 113. Coupling can be achieved utilising a variety of mechanisms and could include capacitive or inductive coupling. It will be appreciated that the ports 101, 102, 103 can be provided external to the integrated circuit and coupled via on board or off board components to the respective ring segment 111, 112, 113, which is typically formed from conductive tracks on the integrated circuit.

The microwave circulator further includes a plurality of superconducting tunnel junctions 121, 122, 123 interconnecting each pair of adjacent ring segments 111, 112, 113 to form a circulator ring. The tunnel junctions 121, 122, 123 are configured so that when a bias, such as a magnetic or electric bias, is applied to the tunnel junctions 121, 122, 123, signals transmitted between the ports 101, 102, 103 undergo a phase shift as they traverse the tunnel junctions 121, 122, 123 between the ring segments 111, 112, 113.

Appropriate configuration of the phase shift can be arranged to cause appropriate interference between signals travelling through the circulator ring so that signals propagate to an adjacent port 101, 102, 103 in a propagation direction, but do not propagate to an adjacent port 101, 102, 103 in a counter-propagation direction. For example, when a signal is input via the port 101, the signal is transmitted in both propagation and counter propagation directions. The signals travelling in both directions around the ring interfere when received at the ports 102, 103. Through appropriate configuration of the phase shifts, this can be arranged to ensure constructive interference at port 102 and destructive interference at port 103, thereby ensuring signals received on port 101 are propagated to port 102 only.

Furthermore, as the phase shifts depend on factors, such as the applied bias, it will be appreciated that adjusting the bias can be used to adjust the responsiveness of the circulator, for example to reverse a propagation direction, adjust a frequency response, switch the circulator on or off, or the like. Thus, controlling an applied bias, can be used to allow the circulator to provide various functionality, including but not limited to reversing a direction of signal propagation, or allowing the circulator to act as a switch, an isolator, a duplexer, a filter, an attenuator.

Accordingly, the above described arrangement acts as a microwave circulator, allowing a microwave signal to be forwarded to an adjacent port 101, 102, 103 in a propagation direction only. It will be appreciated that this arrangement is broadly similar to that described in "A passive on-chip, superconducting circulator using rings of tunnel junctions" by Clemens Müller, Shengwei Guan, Nicolas Vogt, Jared H. Cole, Thomas M. Stace, 28 Sep. 2017 arXiv:1709.09826, the contents of which are incorporated herein by cross reference.

Operation of the microwave circulator is highly dependent on the external control parameters, such as applied biases, that optimize the circulator performance. Whilst fluctuations in external controls can generally be accommodated relatively easily, greater impacts can arise as a result of quantum effects within the device itself. Specifically, it has been identified that quasiparticle poisoning can occur, for example arising as a result of quasiparticle tunnelling through the superconducting junctions, which in turn leads a change in the effective charge of each ring segment. As this results in an effective voltage bias to the ring segment, this in turn causes the ring segment to have a different energy spectra and scatter signals differently, in turn resulting in different circulation performance, which impacts on the ability to operate correctly as a microwave circulator. For example, this may result in only partial propagation of a signal to an adjacent node in a propagation direction, with only partial attenuation of the signal at other nodes, or can result in a reversal in propagation direction.

Whilst the impact of this could be mitigated by retuning the circulator, for example, by changing a bias voltage applied to each ring segment, typically such corrections would take too long to implement, meaning operation of the microwave circulator would be impractical.

Accordingly, in one example, the circulator includes at least one feature to at least partially suppress quasiparticles within the circulator, for example to prevent quasiparticle tunnelling between ring segments across junctions and/or to prevent quasiparticle formation within the circulator, for example as a result of external factors, such as cosmic rays, which can directly or indirectly create quasiparticles. For example, quasiparticles could be formed by a phonon shower generated in the absorption of a cosmic ray elsewhere in the substrate of the circuit. A variety of different features could be used depending on the preferred implementation, such as band gap engineering of tunnelling junctions and/or the presence of quasiparticle traps.

Accordingly, this allows a microwave circulator to be constructed utilising on-chip superconducting tunnel junctions, and which suppresses quasiparticles, and in particular quasiparticle tunnelling, allowing the microwave circulator to demonstrate a consistent response over operational time periods, making the circulator suitable for use in practical applications.

A number of further features will now be described.

In one example, the feature includes at least one element described as a quasiparticle trap. In this regard, the quasiparticle trap is typically a normal metal and/or superconductor having a lower energy gap than the ring segments, which therefore preferentially attracts and retains quasiparticles. In one particular example, a quasiparticle trap is provided in each ring segment, for example by depositing superconducting material on each of the ring segments, thereby suppressing quasiparticle tunnelling between ring segments. However, this is not essential and additionally, and/or alternatively, a quasiparticle trap can be provided in a ground plane associated with the circulator, thereby suppressing quasiparticle tunnelling into the circulator.

In another example, the feature includes gap engineering of one or more of the tunnel junctions. In this regard, the tunnel junctions can be engineered so that different sides of the tunnel junction have different energy gaps, meaning quasiparticles formed on one side of the junction are less likely to tunnel to the other side. The tunnelling junctions typically include superconducting electrodes separated by a tunnelling barrier, with the different energy gap being achieved by forming the electrodes with different thicknesses and/or using electrodes made of different superconducting materials.

Typically the propagation direction is dependent upon the magnitude and/or polarity of the applied bias. This also allows propagation to be controlled by adjusting a magnitude and/or polarity of the bias, for example, allowing a propagation direction to be reversed and/or to switch the circulator on or off. The applied bias will typically include a central bias applied to all of the tunnel junctions 121, 122, 123 and may also include a segment bias applied to the tunnel junctions 121, 122, 123 in each ring segment 111, 112, 113. These biases can include a central magnetic biasing field generated by placing the integrated circuit in a magnetic field, and segment bias electric fields generated by applying voltages to one or more of the ring segments.

Figure 2A:
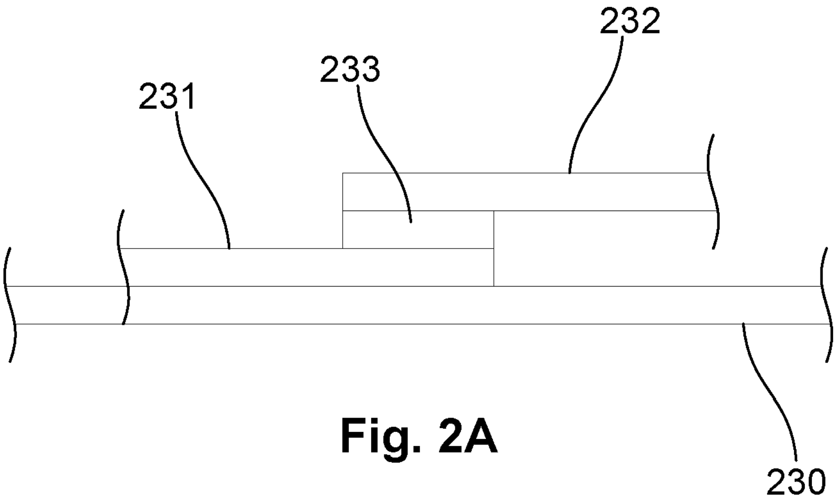
FIGS. 2A and 2B are schematic side and plan views of a one embodiment of a Josephson junction.
Figure 2B:
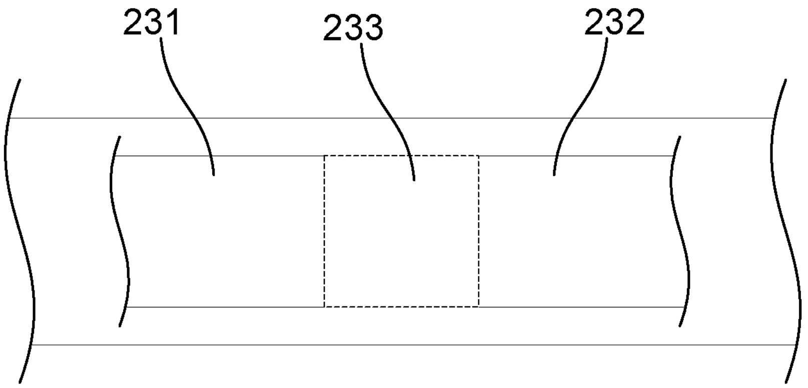

The tunnel junctions 121, 122, 123 are typically Josephson junctions including superconducting electrodes separated by a tunnelling barrier. An example of the physical construction of a single Josephson junction is shown in FIGS. 2A and 2B.

In this example the integrated circuit includes an integrated circuit substrate 230 and a first superconducting layer 231 provided on the substrate 230, which forms a lower electrode of the junction. An insulating layer 233 is provided on part of the first superconducting layer 231 to form the Josephson tunnelling barrier, with a second superconducting layer 232 then being provided on top of the insulating layer to form an upper electrode. In general the superconducting layers are made of niobium and/or aluminium, whilst the insulating layer is made aluminium oxide. It will be appreciated however that other suitable arrangements can be used.

As mentioned above, in one example, the junction is engineered so that the energy gap of the superconducting materials on either side of the junction differ, thereby reducing the likelihood of quasiparticle tunnelling across the junction. In one example, this is achieved by forming the layers 231, 232 of different materials, and/or providing layers 231, 232 with different thicknesses.

Figure 2C:
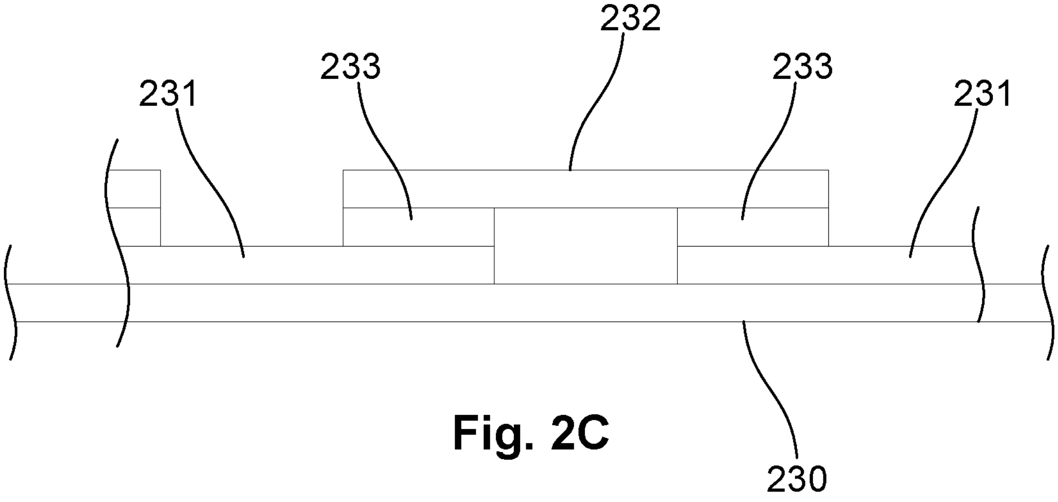
FIG. 2C is a schematic side view showing a number of interconnected Josephson junctions.

It will be appreciated that multiple junctions can be arranged in series by having the second superconducting layer spanning the insulation layer on adjacent lower electrodes to form counter electrodes for each Josephson junction as shown in FIG. 2C. Further construction details and fabrication techniques for such arrangements are known in the art, for example from the manufacture of Josephson voltage standard devices, and this will not therefore be described in any further detail.

The properties of the Josephson junction will vary depending on the physical configuration of the junctions, including the types of materials used, and the thickness and cross sectional area of the insulating layer. In one example, the Josephson junctions typically have a cross-sectional area, shown by dotted lines in FIG. 2B, that is selected in order to achieve a desired Josephson energy, $E_J$ for a given applied signal. Typically, the junctions are 200 nm by 200 nm and critical currents of the order of tens of nA, although it will be appreciated that the exact size and current density will depend on the materials used and the particular characteristics sought for the arrangement.

In the above examples the circulators include three ports and three ring segments although this is not intended to be limiting, and other arrangements, such as four port variations, are contemplated.

Further details of specific arrangements will now be described.

Figure 3B:
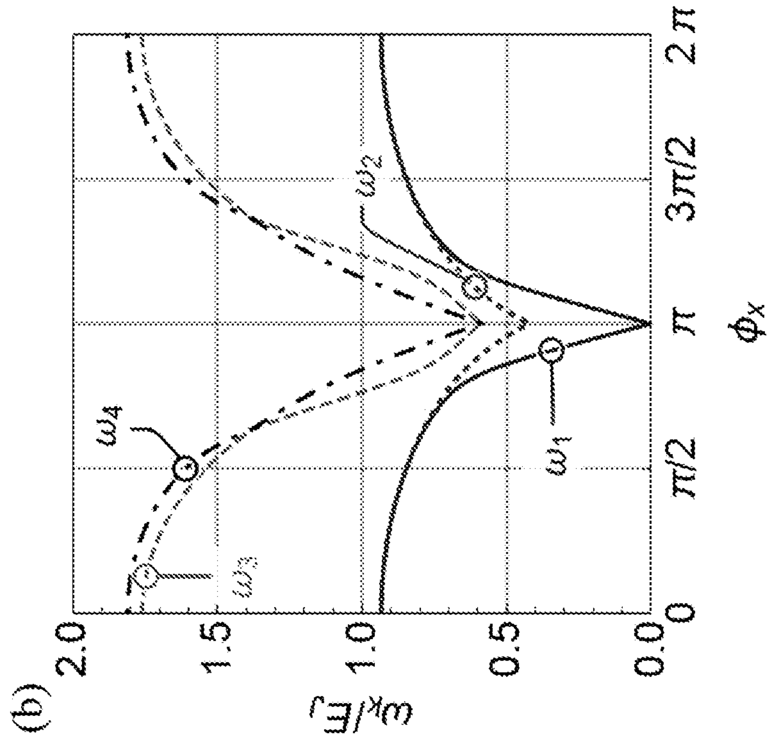
FIG. 3B is a schematic diagram of the first four excited-state energies of the circulator ring of FIG. 3B.
Figure 3A:
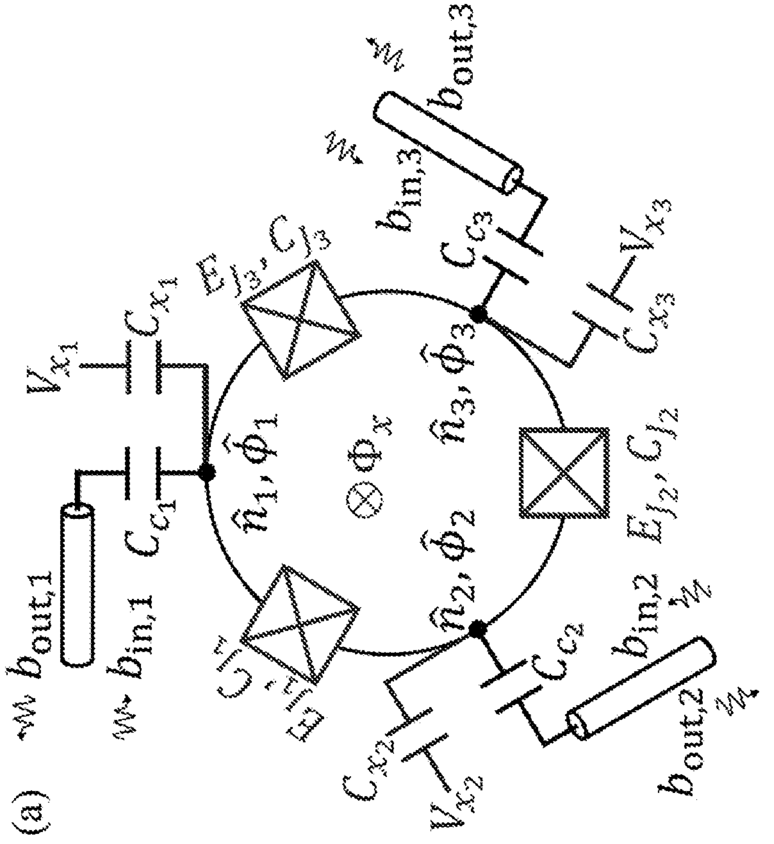
FIG. 3A is a schematic circuit diagram of a passive on-chip superconducting circulator.

FIG. 3A depicts an example circulator circuit including three superconducting ring segments separated by the three Josephson junctions each of which is described by a Josephson energy $E_{J_j}$ and a junction capacitance $C_{J_j}$ (j=1, 2, 3). The state of each of the three islands are represented by a pair of conjugate variables, the number of Cooper pairs $\hat{n}_j$ and the superconducting phase $\hat{\varnothing}_j$; they are biased by external voltages $V_{x_j}$, with gate capacitances $C_{x_j}$ and coupled to three external waveguides by coupling capacitances $C_{c_j}$. The circulator ring is threaded by an external flux $\Phi_x$. Input fields $b_{in,j}$ propagating along the waveguides interact with the ring and scatter off into output fields $b_{out,j}$.

Considering the case of a symmetric Josephson-junction ring, $E_{J_j}=E_J$ and $C_{J_j}=C_J$, and further assume that $C_{x_j}=C_x$ and $C_{c_j}=C_c$, then as derived the circulator ring Hamiltonian is:

$$\hat{H}_{ring}=\frac{(2e)^2}{2}(\hat{n}-n_x)\mathbb{C}^{-1}(\hat{n}-n_x)-E_J\sum_{j=1}^{3}\cos\left(\hat{\phi}_j-\hat{\phi}_{j+1}-\frac{1}{3}\hat{\phi}_x\right) \tag{1}$$

where: $\hat{n}=\hat{n}_1, \hat{n}_2, \hat{n}_3$, $n_x=n_{x1}, n_{x2}, n_{x3}$ with $n_{x_j}=C_{x_j}V_{x_j}(2e)$ the (dimensionless) charge bias on the ring segment j, $\phi_x=2\pi\Phi_x/\Phi_0$ is the reduced flux bias which has been shared equally by the three Josephson junctions with $\Phi_0=h/(2e)$ the superconducting quantum flux, and $\mathbb{C}$ is the capacitance matrix.

To account for the fact the total number of Cooper pairs on the ring is conserved, we define new coordinates:

$$\hat{n}_1'=\hat{n}_1,\ \hat{n}_2'=-\hat{n}_2,\ \hat{n}_3'=\hat{n}_1+\hat{n}_2+\hat{n}_3=n_0, \tag{2}$$

$$\hat{\phi}_1'=\hat{\phi}_1-\hat{\phi}_3,\ \hat{\phi}_2'=\hat{\phi}_3-\hat{\phi}_2,\ \hat{\phi}_3'=\hat{\phi}_3. \tag{3}$$

This recasts the Hamiltonian $\hat{H}_{ring}$ into:

$$\hat{H}_{ring}= E_{C\Sigma}\left(\left(\hat{n}_1'-\frac{1}{2}(n_0+n_{x_1}-n_{x_3})\right)^2+\left(\hat{n}_2'-\frac{1}{2}(n_0+n_{x_2}-n_{x_3})\right)^2-\hat{n}_1'\hat{n}_2'\right)- E_J\left(\cos\left(\hat{\phi}_1'-\frac{1}{3}\hat{\phi}_x\right)+\cos\left(\hat{\phi}_2'-\frac{1}{3}\hat{\phi}_x\right)+\cos\left(\hat{\phi}_1'+\hat{\phi}_2'+\frac{1}{3}\hat{\phi}_x\right)\right) \tag{4}$$

Where $E_{c\Sigma}=(2e)^2/C_\Sigma$ is the charging energy with $C_\Sigma=3C_j+C_x+C_c$ and the value of $n_0$ is set by the external biases.

In terms of its eigenbasis $\{|k\rangle; k=0,1,2, \ldots\}$ $\hat{H}_{ring}$ offset can be rewritten from ground state as:

$$\hat{H}_{ring}=\sum_{k>0}\omega_k|k\rangle\langle k| \tag{5}$$

where $\omega_k$ is the eigenenergy associated with the excited state $|k\rangle$ (k>0).

In FIG. 3B, the first four excited-state energies $\omega_k$ (k=1, 2,3,4) are plotted versus the reduced external flux $\varnothing_x$. These eigenenergies are arranged in pairs; for large ranges of $\varnothing_x$, $\omega_1$ and $\omega_2$ are nearly degenerate and so are $\omega_3$ and $\omega_4$. Circulation of signals in the device is mediated by these excitations: depending on the external biases and the driving frequency, signals emitted from different excitations interfere constructively destructively resulting in clockwise/counterclockwise circulation. This resembles the operation of a ferrite circulator whose non-reciprocal transmission is created by interference of near-resonant counterpropagating modes.

To compute output fields scattering from the circulator, an SLH framework is used to based on a Hamiltonian description of quantized bosonic fields for the waveguides interacting with the ring system. The total Hamiltonian for the combined system is:

$$\hat{H}_{tot}=\hat{H}_{ring}+\hat{H}_{wg}+\hat{H}_{int}, \tag{6}$$

where $\hat{H}_{ring}$ is given in Eq. (4) and the waveguide Hamiltonian $\hat{H}_{wg}$ is:

$$\hat{H}_{wg}=\sum_{j=1}^{3}\int_{\infty}^{\infty}d\omega\omega\hat{a}_j^\dagger(\omega)\hat{a}_j(\omega) \tag{7}$$

which is the sum of three independent continua of harmonic oscillator modes. The interaction Hamiltonian $\hat{H}_{int}$ under the Markov and rotating wave approximations, is:

$$\hat{H}_{int}=\sum_{j=1}^{3}\int_{\infty}^{\infty}d\omega\omega\left(\hat{a}_j^\dagger(\omega)\hat{q}_{j,-}+\hat{a}_j(\omega)\hat{q}_{j,+}\right), \tag{8}$$

where $\hat{q}_j\equiv(\hat{q}_{j,+})^\dagger=\Sigma_{k<l}\langle k|\hat{q}_j|l\langle\ |k\rangle\rangle\langle\ l|$ is the upper triangularized part (in the ring eigenstate basis) of $\hat{q}_j$ which is the coupling operator given in terms of $\hat{n}_1'$ and $\hat{n}_2'$ as:

$$\hat{q}_1=\hat{n}_1'+\hat{n}_{x_1}',\ \hat{q}_2=-\hat{n}_2'+\hat{n}_{x_2}',\ \hat{q}_3=-\hat{n}_1'+\hat{n}_2'+\hat{n}_{x_1}', \tag{9}$$

with $n_{x_j}'$ the rescaled charge biases due to coordinate transformation. From Eq. (2) it is clearly seen that:

$$\hat{q}_1=\hat{n}_1+\hat{n}_{x_1}',\ \hat{q}_2=\hat{n}_2+\hat{n}_{x_2}',\ \hat{q}_3=\hat{n}_3-\hat{n}_0+\hat{n}_{x_3}', \tag{10}$$

In Eq. (8) $\Gamma$ is the waveguide-ring coupling strength explicitly given by:

$$\Gamma=\frac{16Z_{wg}}{R_K}\left(\frac{C_c}{C_\Sigma}\right)^2\omega_d \tag{11}$$

where $Z_{wg}$ is the waveguide impedance, $R_K=h/e^2\approx25.8$ kΩ is the resistance quantum, and $\omega_d$ is the driving frequency. $\Gamma=32\alpha\ (Z_{wg}/Z_{vac})(C_c/C_\Sigma)^2\omega_d$, where $\alpha=Z_{vac}/(2R_K)$ is the fine-structure constant and $Z_{vac}\approx 377\Omega$ is the vacuum impedance. As $\alpha\approx 1/137$ and $C_c/C_\Sigma<1$ by definition, for the typical situation of $Z_{wg}\approx 50\Omega$ it is found that $Z_{wg}/Z_{vac}\approx 0.13$ and therefore $\Gamma<0.03\ w_d$ justifying the approximations used to derive $\hat{H}_{int}$. The coupling strength $\Gamma$ additionally sets the scale for resonance conditions and acceptable parameter imperfections in the circulator ring.

Using the above Hamiltonians and considering single mode weak coherent fields at the input ports with the amplitudes $\beta_j$ and the frequency $\omega_d$, the SLH master equation for the circulator density operator $\rho$ is given by:

$$\dot{\rho} = -i\left[\hat{H}_{ring} + \hat{H}_{drive}, \rho\right] + \sum_{j=1,2,3} \mathcal{D}[\hat{b}_{out,j}]\rho \tag{12}$$

Where:

$$\hat{H}_{drive} = -\frac{i}{2}\sqrt{\Gamma}\sum_{j=1}^{3}\left(\beta_j e^{-i\omega_d t}\hat{q}_{j,+} - h.c.\right) \tag{13}$$

$$\hat{b}_{out,j} = \beta_j e^{-i\omega_d t} + \sqrt{\Gamma}\,\hat{q}_{j,-} \tag{14}$$

And $\mathcal{D}[\hat{O}]\rho=\frac{1}{2}(2\hat{O}\rho\hat{O}^\dagger-\rho\hat{O}^\dagger\hat{O}-\hat{O}^\dagger\hat{O}\rho)$ In Eq. (12), the commutator represents coherent evolution of the ring system plus the effect of dynamics induced from the external driving fields which is described by $\hat{H}_{drive}$ in Eq. (13), while the dissipation is due to couplings to the waveguides. Equation (14) represents the standard input-output relation in which the output field is the sum of the input field and the field radiated from the ring system.

In previous work relating to on-chip microwave circulators, there is a lack of consideration of the effect of quasiparticle tunnelling across junctions in the circulator ring. In this regard, because of quasiparticle tunnelling the circulator system is decomposed into four quasiparticle sectors characterized by respective island charge-parities. These sectors have different energy spectra and scatter signals differently, resulting in different circulation performances. Spectroscopic measurements performed on the circulator ring may show mixture of the spectra from the different quasiparticle sectors, depending on circuit parameters.

Figure 4B:
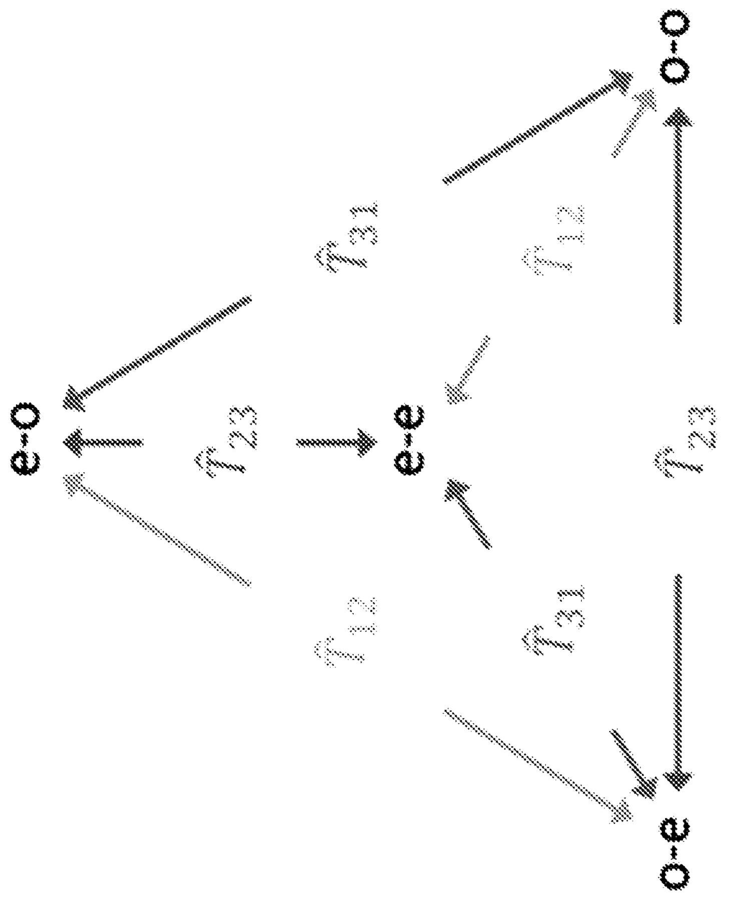
FIG. 4B is a schematic diagram illustrating example charge-parity sectors for the microwave circulator of FIG. 4A.
Figure 4A:
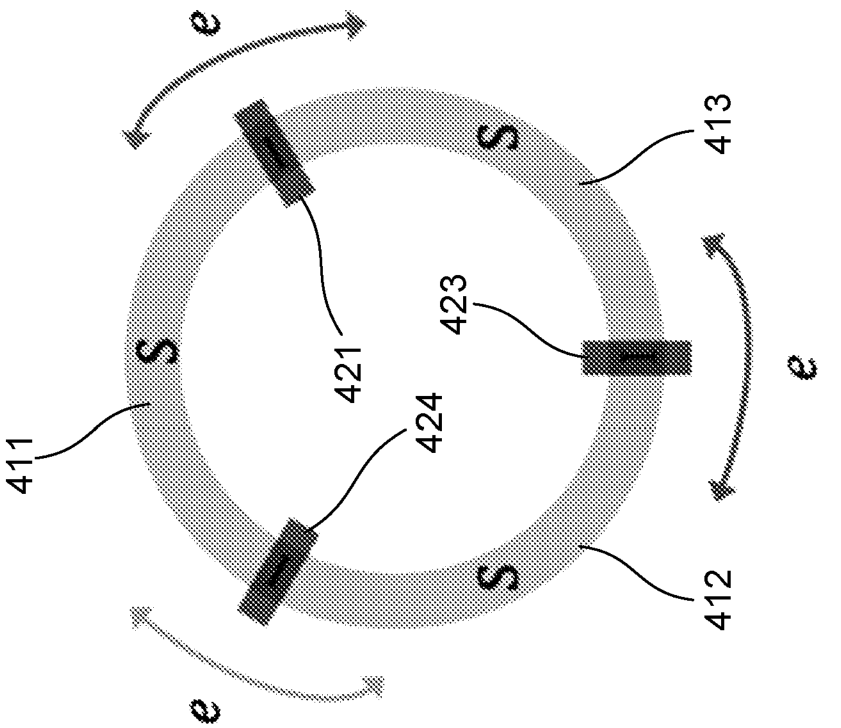
FIG. 4A is schematic diagram of an example of a microwave circulator including three superconducting-insulator-superconducting (SIS) junctions.

An example of a microwave circulator for illustrating quasiparticle tunnelling is shown in FIGS. 4A and 4B.

In this example, the circulator ring includes ring segments 411, 412, 413 interconnected by junctions 421, 422, 423 to form a loop of three superconducting-insulator-superconducting (SIS) junctions. Quasiparticles can tunnel across these junctions, giving rise to even-odd switching of parities of the numbers of electrons in the superconducting ring segments. Since the ring is capacitively isolated from outside environments, its total number of electrons is conserved. Then the charge-parity configuration of the whole circulator ring can be represented by parities of two out of the three ring segments, such as the ring segments 411, 412, only. Furthermore, in the following we assume the total charge-parity of the three ring segments is even. Similar arguments hold for the case of an odd total charge-parity.

The above arguments result in four accessible charge parity sectors with total even parity: even-even (e-e), even-odd (e-o), odd-even (o-e), and odd-odd (o-o). It should be noted that there is also a total odd parity arrangement, but charge is conserved, and so the device will stay in the same total parity sector, and can be treated in a similar manner. Formally, e-e means $n_1'$ mod 2=0 and $n_2'$ mod 2=0 with $n_1'$ and $n_2'$ respectively being the eigenvalues of the charge operators $\hat{n}_1'$ and $\hat{n}_2'$ and analogous definitions hold for e-o, o-e, and o-o. The sectors are coupled to each other by tunnelling of a quasiparticle between adjacent ring segments. For example, coupling between the ring segments e-e and e-o is described by the following operator, which represents quasiparticle tunnelling between the ring segments 412 and 413:

$$\hat{T}_{23} = \sin\left(\left(\hat{\phi}_3 - \hat{\phi}_2\right)/2\right) \equiv \sin\left(\hat{\phi}_2'/2\right) \tag{15}$$

All the quasiparticle-tunnelling operators for coupling among the four sectors are shown in FIG. 4B.

For a microwave circulator of this form, the Hamiltonian for the ring is given by:

$$\hat{H}_{ring} = E_{C\Sigma}\left(\left(\hat{n}_1' - \frac{1}{2}(n_0 + n_{x_1} - n_{x_3})\right)^2 + \left(\hat{n}_2' - \frac{1}{2}(n_0 + n_{x_2} - n_{x_3})\right)^2 - \hat{n}_1'\hat{n}_2'\right) - E_J\left(\cos\left(\hat{\phi}_1' - \frac{1}{3}\hat{\phi}_x\right) + \cos\left(\hat{\phi}_2' - \frac{1}{3}\hat{\phi}_x\right) + \cos\left(\hat{\phi}_1' + \hat{\phi}_2' + \frac{1}{3}\hat{\phi}_x\right)\right) \tag{16}$$

It should be noted that tunnelling of a quasiparticle into/out of a superconducting island is effectively equivalent to shifting the charge bias on that island by ±1e. Therefore, the sector e-o can be related to the sector e-e by adding/removing charge biases on the islands 312 and 313 by half a Cooper pair.

Thus, if:

$$\hat{H}_{ring}^{e-e}(n_{x1}, n_{x2}, n_{x3}) = \hat{H}^{ref}(n_{x1}, n_{x2}, n_{x3}) \tag{17}$$

then $$\hat{H}_{ring}^{e-o}(n_{x1}, n_{x2}, n_{x3}) = \hat{H}^{ref}(n_{x1}, n_{x2} \pm 1/2, n_{x3} \mp 1/2) \tag{18}$$

$$\hat{H}_{ring}^{o-e}(n_{x1}, n_{x2}, n_{x3}) = \hat{H}^{ref}(n_{x1} \mp 1/2, n_{x2}, n_{x3} \pm 1/2) \tag{19}$$

$$\hat{H}_{ring}^{o-o}(n_{x1}, n_{x2}, n_{x3}) = \hat{H}^{ref}(n_{x1} \pm 1/2, n_{x2} \mp 1/2, n_{x3}) \tag{20}$$

To account for the presence of quasiparticles, $n_1'$ and $n_2'$ of the Hamiltonian $\hat{H}_{ring}$ in Eq. (4) as single-electron-number operators, instead of Cooper-pair-number ones, and the operators $\cos(\hat{\phi}_1')$ and $\cos(\hat{\phi}_2')$ now describe tunneling of two-electron charges. In the single-electron basis $\{|n_1', n_2'; n_0\mathbb{Z}; n_1', n_2' \in \mathbb{Z}\}$, the ring Hamiltonian $\hat{H}_{ring}'$ is expressed as a diagonal block matrix $H_{ring}'$ with four blocks corresponding to the Hamiltonians of the four sectors:

$$\hat{H}'_{ring} = \begin{pmatrix} H_{ring}^{e-e} & & & \\ & H_{ring}^{e-o} & & \\ & & H_{ring}^{o-e} & \\ & & & H_{ring}^{0-0} \end{pmatrix} \begin{matrix} e-e \\ e-o \\ o-e \\ o-o \end{matrix} \quad (21)$$

(columns: $e-e \;\; e-o \;\; o-e \;\; o-o$)

where $H_{ring}^{e-e}$ is a matrix representation of $\hat{H}_{ring}^{e-e}$ with $n_1'$ and $n_2'$ both being even-valued and analogously for $H_{ring}^{e-o}$, $H_{ring}^{o-e}$, $H_{ring}^{o-o}$. The above representation of $\hat{H}_{ring}'$ stems from the fact the operators $\hat{n}_1'$, $\hat{n}_2'$, $\cos(\hat{\phi}_1')$, $\cos(\hat{\phi}_2')$ and $\cos(\hat{\phi}_1'+\hat{\phi}_2')$ respect charge-parities of the ring siegments, i.e., they do not couple between the quasiparticle sectors and thus are of a block-diagonal as Eq. form in (21). For the sector-coupling operator $\hat{T}_{23}=\sin(\hat{\emptyset}_2'/2)$, as it couples between sector pairs (e-e, e-o) and (o-e, o-o) (see FIG. 4B), its sector representation is:

$$T_{23} = \begin{pmatrix} & \times & & \\ \times & & & \\ & & & \times \\ & & \times & \end{pmatrix} \begin{matrix} e-e \\ e-o \\ o-e \\ o-o \end{matrix} \quad (22)$$

(columns: $e-e \;\; e-o \;\; o-e \;\; o-o$)

where the notation x indicates a non-zero block matrix. Similar block forms for other tunnelling operators $\hat{T}_{12}=\sin((\hat{\emptyset}_1'+\hat{\emptyset}_2')/2)$, $\hat{T}_{31}=\sin(\hat{\emptyset}_1'/2)$, are:

$$T_{12} = \begin{pmatrix} & & & \times \\ & & \times & \\ & \times & & \\ \times & & & \end{pmatrix} \begin{matrix} e-e \\ e-o, \\ o-e \\ o-o \end{matrix} \quad (23)$$

(columns: $e-e \;\; e-o \;\; o-e \;\; o-o$)

$$T_{31} = \begin{pmatrix} & & \times & \\ & & & \times \\ \times & & & \\ & \times & & \end{pmatrix} \begin{matrix} e-e \\ e-o, \\ o-e \\ o-o \end{matrix}$$

(columns: $e-e \;\; e-o \;\; o-e \;\; o-o$)

Having identified the four charge-parity sectors, it is possible to evaluate the transition rates between them and compute respective circulation performances. To this end, an SLH master equation including quasiparticle tunnelling is derived as:

$$\dot{\rho}' = -i\left[\hat{H}'_{ring} + \hat{H}'_{drive}, \rho'\right] + \sum_{j=1}^{3} \mathfrak{D}[\hat{b}'_{out,j}]\rho' + \sum_{s\neq s'} \sum_{k,k'} \Gamma_{k,s;k',s'} \mathfrak{D}[|k', s'\rangle\langle k, s|]\rho', \quad (24)$$

where the prime at the operators is added to remind that they are treated within the quasiparticle sector picture, s and s' label the quasiparticle sectors {e-e, e-o, o-e, o-o}, $|k', s'\rangle\langle k, s|$, is the sector-jump operator which describes a transition from a state $|k, s\rangle$ belong to the sector s to another state $|k', s'\rangle$ belonging to the sector s', and $\Gamma_{k,s;k',s'}$ is the rate for such transition. Specifically, $\Gamma_{k,s;k',s'}$ is computed by:

$$\Gamma_{k,s;k',s'} = \left|\langle k', s'|\hat{T}_{ss'}|k, s\rangle\right|^2 S_{qp}(\omega_{k,s;k',s'}) \quad (25)$$

where the sector-coupling operator $\hat{T}_{ss'}$ is given explicitly in FIG. 4B for each inter-sector transition, $\omega_{k,s;k',s'}$ is the transition energy between the states $|k, s\rangle$ and $|k', s'\rangle$ and $S_{qp}(\omega)$ is the quasiparticle spectral density. For a relaxation process with $\omega>0$, $S_{qp}(\omega)$ is given by:

$$S_{qp}(\omega) = \frac{16E_J}{\pi}\int_0^\infty dx \frac{1}{\sqrt{x}\sqrt{x+\frac{\omega}{\Delta}}}\left(f[(1+x)\Delta](1-f[(1+x)\Delta+\omega])\right), \quad (26)$$

where f[E] is the quasiparticle distribution function. At equilibrium, it is expected that f[E] is of the form $1/(\exp(E/k_BT)+1)$, but non-equilibrium quasiparticles may be present modifying f[E]. For an excitation process with $\omega<0$, in Eq. (26) replacements $x\to x-\omega/\Delta$ and $\omega\to-\omega$.

At equilibrium and in the limit of high frequency, $\delta E \ll \omega \ll \Delta$ with $\delta E$ the characteristic energy of quasiparticles, it is possible to approximate $S_{qp}(\omega)=(8E_J/\pi)\sqrt{2\Delta/\omega}\,x_{qp}$, where $x_{qp}$ is the quasiparticle density normalized by the Cooper-pair density:

$$x_{qp} = \sqrt{2\pi k_B T/\Delta}\, e^{-\frac{\Delta}{k_B T}}. \quad (27)$$

At $T\approx20$ mK and for aluminium superconductors with $\Delta\approx1.76\, k_BT_C$ and $T_C\approx1.2$K, $x_{qp}$ should be of order $10^{-68}$, effectively suppressing quasiparticle tunnelling in equilibrium BCS superconductors. Experimentally observed results for superconducting circuits nonetheless showed that $x_{qp}\approx10^{-8}$–$10^{-6}$. This indicates the presence of non-equilibrium quasiparticles that may be attributed to different sources, such as stray photons, ionizing radiations from surrounding radioactive materials, and cosmic rays. Besides, the electrons and the phonon baths can be out of equilibrium, so that the electrons are typically hotter than the base fridge temperature.

Therefore, in order to include non-equilibrium quasiparticles, in Eq. (27) the base temperature T ($\approx$20 mK) is replaced with an effective temperature $T_{eff}\approx200$ mK. For $E_J\sim2\pi\times10$ GHz and $$\frac{E_{C\Sigma}}{E_J} = 0.35$$

numerically $|\langle k',s'|\hat{T}_{ss'}|k,s\rangle|^2\sim10^{-2}$–$10^{-1}$ and $\omega_{k,s;k',s'}\sim2\pi\times10$ GHZ, so that for $\Delta\approx1.76\, k_BT_C$ and $T_C\approx1.75$K, the transition rate $\Gamma_{k,s;k',s'}$ is of the order $10^{-1}$–$10^{0}$ ms as observed in experiments.

For a symmetric Josephson-junction ring, since its Hamiltonian is block-diagonal across the charge-parity sectors, the circulator ring will evolve within one particular sector when no sector jumps (i.e., quasiparticle tunnellings) occur. In fact the master equation (24) can be unravelled into a stochastic jump evolution equation with intermittent jumps causing transitions between the sectors.

Figures 5A, 5B:
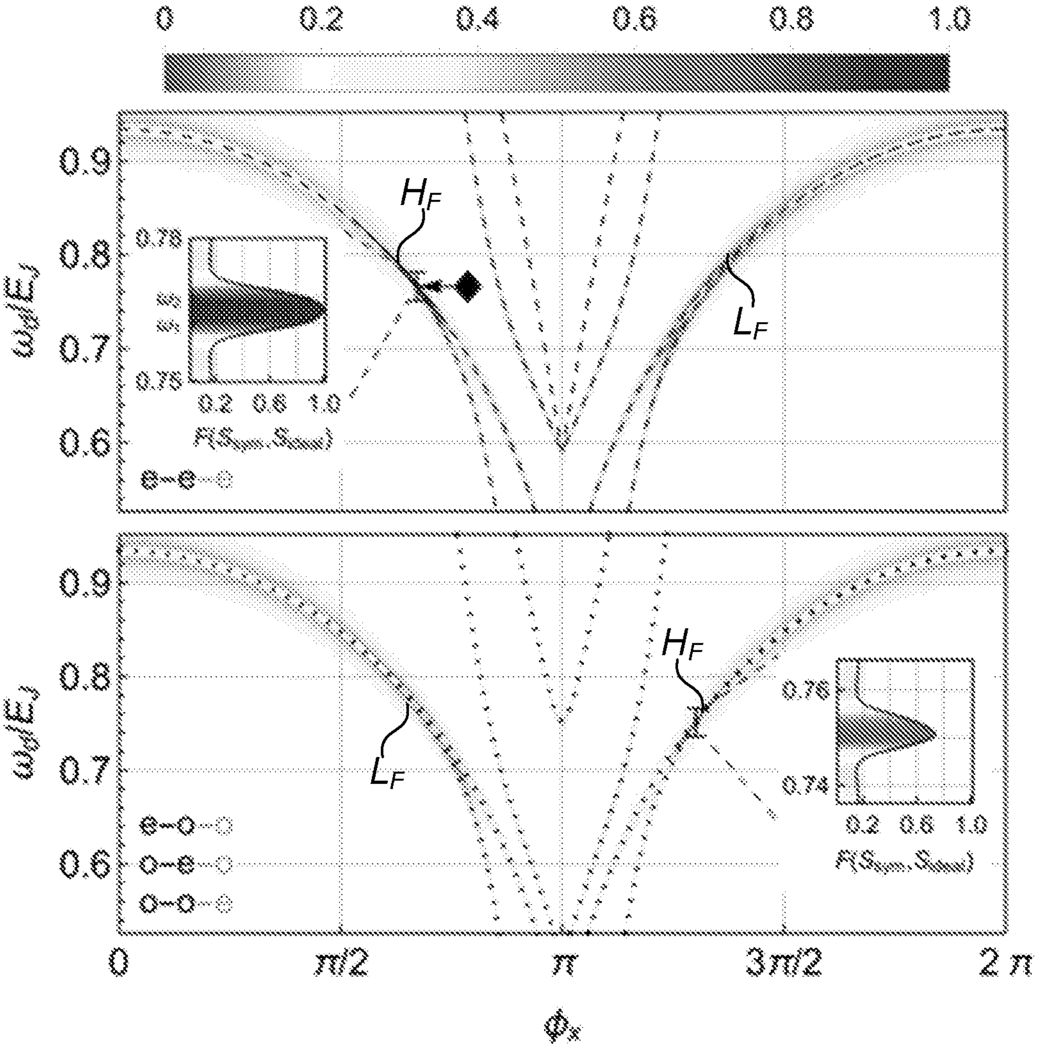
FIG. 5A is a graph illustrating the circulator dependence on flux bias and driving frequency for a symmetric circulator ring with symmetric charge biases within a sector e-e.
FIG. 5B is a graph illustrating the circulator dependence on flux bias and driving frequency for a symmetric circulator ring with symmetric charge biases within sectors e-o, o-e, and o-o.
Figures 6A, 6B, 6C, 6D:
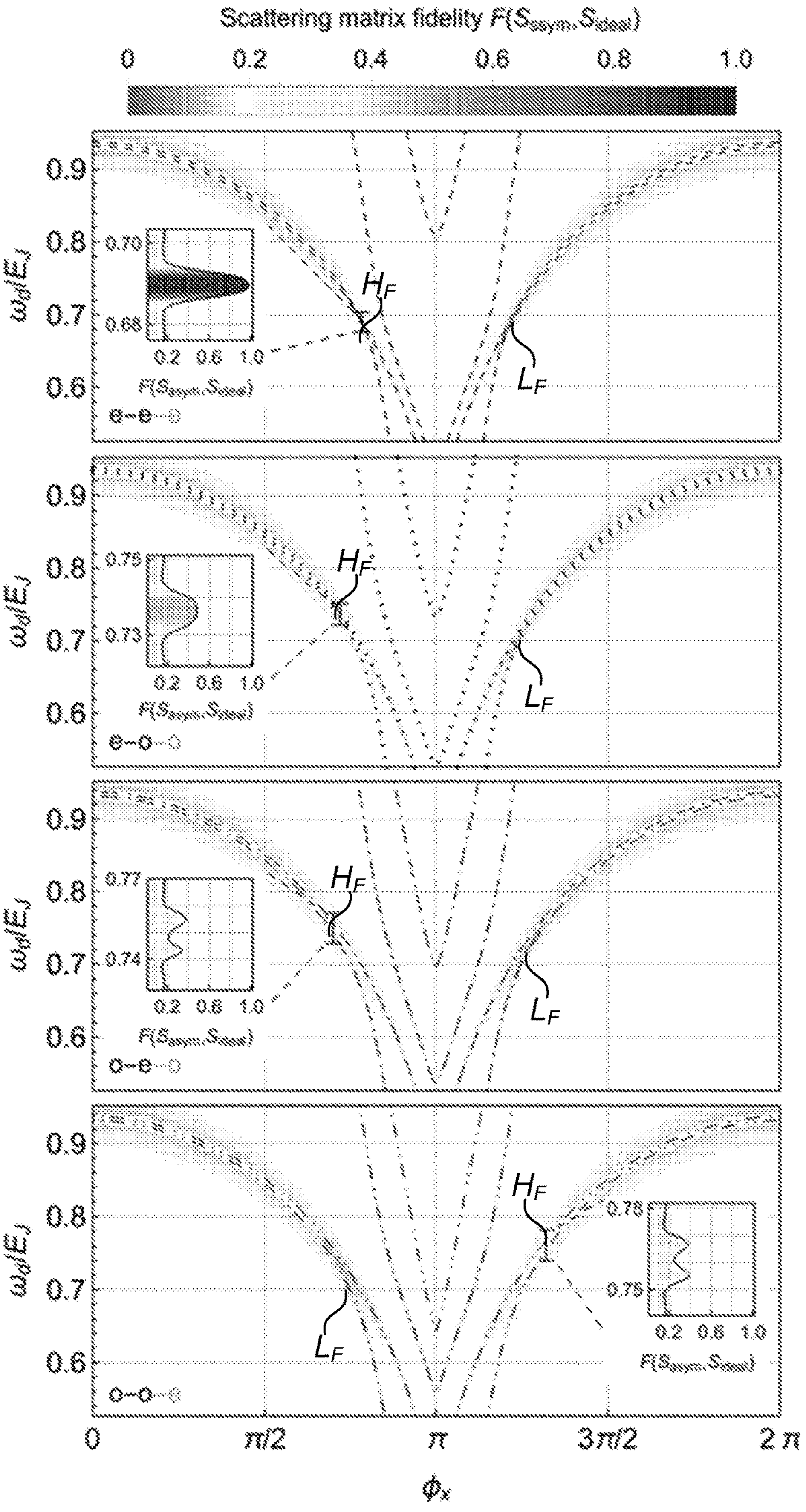
FIG. 6A is a graph illustrating the circulator dependence on flux bias and driving frequency for an asymmetric circulator ring with symmetric charge biases within a sector e-e.
FIG. 6B is a graph illustrating the circulator dependence on flux bias and driving frequency for an asymmetric circulator ring with symmetric charge biases within a sector e-o.
FIG. 6C is a graph illustrating the circulator dependence on flux bias and driving frequency for an asymmetric circulator ring with symmetric charge biases within a sector o-e.
FIG. 6D is a graph illustrating the circulator dependence on flux bias and driving frequency for an asymmetric circulator ring with symmetric charge biases within a sector o-o.

In FIGS. 5A and 5B, variations to the scattering-matrix fidelity $F(S_{num}^{sym}, S_{ideal})$ as a function of the reduced external flux $\phi_x$ and the driving frequency $\omega_d$ for the symmetric circulator ring with symmetric charge biases ($n_{x_j}$=⅓ for j=1, 2, 3) in the four quasiparticle sectors. For illustrative purpose the coupling strength Γ defined in Eq. (11) is increased by choosing a higher waveguide impedance $Z_{wg}$=200Ω.

For sector e-e in FIG. 5A a high-fidelity region $H_F$ is observed with $\phi_x$ ranging from about 1.7 to 2.3 and a low-fidelity region $L_F$ with $\phi_x$ ranging from about 4 to 4.6 are symmetric about $\phi_x=\pi$. Such symmetry is owing to the mirror-symmetry of the eigenstates of the circulator ring with respect to a half-quantum flux bias (see also FIG. 3B), by which the high-fidelity region yields strong clockwise signal circulation while the low-fidelity region counter-clockwise signal circulation. At the optimal working point ($\phi_x$~2.11), the bandwidth evaluated from the inset in FIG. 7A is roughly 0.01$E_J$ and is thus of order of 2π×100 MHz for $E_J$~2π×10 GHz. This is consistent with the estimation made from Eq. (11) which yields the coupling Γ~0.01 $E_J$ for $C_c/C_\Sigma$≈0.31, $Z_{wg}$=200Ω, $w_d$≈0.77 $E_J$.

It should be noted that the neutral circulation fidelity at about 0.18 for a non-circulating device is indicated by white in the color scale in FIGS. 5A and 5B (and FIGS. 5C and 5D and 6A to 6D as well). This neutral fidelity is present due to the fact when the driving frequency is far off-resonant with respect to the excited-state energies, transmission of signals in the circulator is vanishing small and there is almost only reflection.

In the other three quasiparticle sectors e-o, o-e, and o-o, the scattering-matrix fidelities are exactly identical for the symmetric circuit and are shown in FIG. 5B. Symmetry of the high-fidelity $H_F$ and low-fidelity regions $L_F$ about $\phi_x=\pi$ is also clearly seen. However, locations of these regions in FIG. 5B are exchanged compared to those in FIG. 5A. Concretely, at ($\phi_x$,$\omega_d$)=(1.76, 0.77 $E_J$) the scattering-matrix fidelity $F(S_{num}^{sym},S_{ideal})$≈0.99 and ($S_{11}$, $S_{21}$, $S_{31}$)≈(0.003, 0.001, 0.996) in the sector e-e, and $F(S_{num}^{sym},S_{ideal})$≈0.14 and ($S_{11}$, $S_{21}$, $S_{31}$)≈(0.104, 0.622, 0.274) for the other sectors, thus indicating that at this working point circulation direction in FIG. 5A is significantly reversed from clockwise to counterclockwise in FIG. 5B. This showcases the adverse influence of quasiparticle tunnelling: assuming the device is circulating signals clockwisely at the high-fidelity region in the sector e-e as in FIG. 5A, then an event of tunnelling of a quasiparticle suddenly transforms the circulator system to the other sectors and reverses the circulation direction as in FIG. 5B. It will be noted that in the above example, the specific values depend on parameter values, such as Josephson junction energies, which will vary depending on fabrication. Accordingly, these values should be considered as illustrative only.

In this example, $F(S_{num}^{sym},S_{ideal})$ for the sector e-e is optimized at ($\omega_d$, $\phi_x$, $n_{x_1}$, $n_{x_2}$, $n_{x_3}$)=(0.77 $E_J$, 2.11, ⅓, ⅓, ⅚). Keeping the three charge biases and plotting the fidelity versus $\omega_d$ and $\phi_x$ for the four sectors, as shown in FIGS. 5C and 5D, it can be seen that the fidelities of the three sectors e-o, o-e, and o-o are identical due to relevant symmetries and there is an exchange in locations of high-fidelity and low-fidelity regions between the sector e-e and the other sectors.

For an asymmetric Josephson-junction ring the junction asymmetry can be considered with $E_{J_1}/E_J$=1, $E_{J_2}/E_J$=1.01, and $E_{J_3}/E_J$=0.99. Numerically optimizing the scattering-matrix fidelity $F(S_{num}^{asym},S_{ideal})$ for the sector e-e and finding the optimal values for the external control parameters as ($\phi_x$, $\omega_d$, $n_{x_1}$, $n_{x_2}$, $n_{x_3}$)=(2.46, 0.69 $E_J$, 0.10, 0.19, 0.84). Fixing the three charge biases and plotting the fidelity versus $\phi_x$ and $\omega_d$ for the four sectors yields the results shown in FIGS. 6A to 6D. It is apparent that the four sectors have quite different performances. The sectors e-e, e-o, and o-e share the same high-fidelity region $H_F$ with $\phi_x$ ranging roughly from 2.1 to 2.5 but with decreasing efficiencies (see the insets in FIGS. 6A and 6B), while the sector o-o has its high-fidelity region mirror-flipped compared to those in the other sectors. This is different from the case of the symmetric circuit considered previously which exhibits exchange of the high-fidelity and low-fidelity regions in the sector e-e and the other sectors. In this example, such difference is a result of junction asymmetry $\delta E_J$=0.01 $E_J$ making the sectors e-o, o-e, and o-o no longer equivalent as in the symmetric-circuit case. Quasiparticle-tunnelling-induced jumps between the sectors of largely dissimilar circulation performances in this asymmetric case make the circulator operate inefficiently.

Since circulation in the above described system is a resonant effect, transmission measurements of the circulator ring will reveal its energy spectrum. Each quasiparticle sector has a distinct spectrum, so measurements performed on a timescale longer than quasiparticle lifetimes will show all the spectra from the four sectors. Coexistence of the even and odd sectors has been observed in experiments with the single-Cooper-pair transistor and the Cooper-pair-box/transmon qubit that feature the "eye-pattern" composing of both even and odd transitions.

Figure 7:
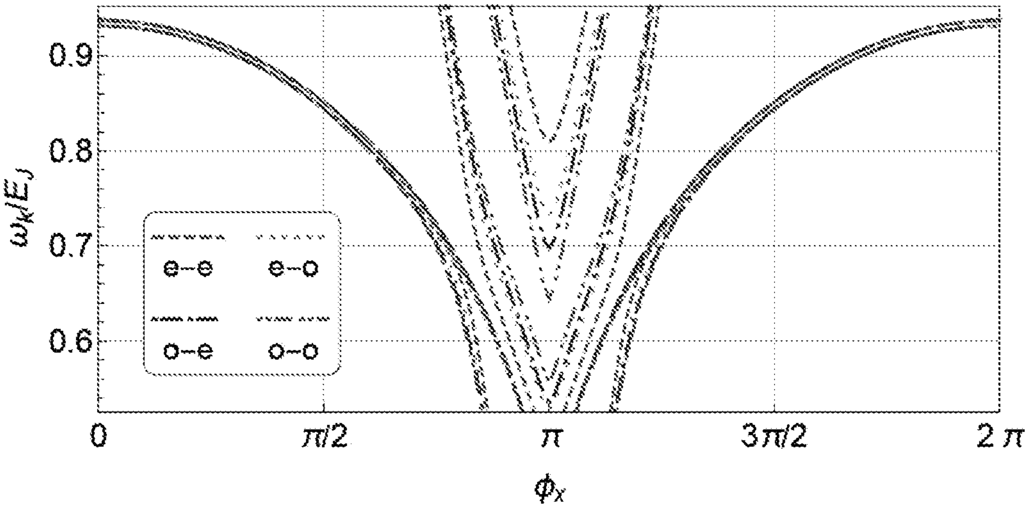
FIG. 7 is a graph illustrating the first four excited-state energies of the four quasiparticle sectors of FIGS. 6A to 6D.

FIG. 7 shows the mixture of spectra from the four sector spectra with the first four excited-state energies $\omega_k$ (k=1, 2, 3, 4 from bottom to top) as functions of the reduced external flux $\phi_x$ for the asymmetric circulator ring. Variations of $\omega_1$ and $\omega_2$ for different sectors are hardly distinguishable for almost the full range of $\omega_x$, as opposed to those of $\omega_3$ and $\omega_4$. The mixture in FIG. 7 serves as a "map" or "signature" demonstrating the presence of the different quasiparticle sectors when carrying out measurements on the circulator ring.

Since the circulator operates in a charge-sensitive regime, towards its experimental realization jumps/drifts of the bias charges on the ring segments should be paid attention to. It has been shown that the circulator operation is robust against perturbative offset-charge drifts. Meanwhile larger charge drifts comparable to one electron occur irregularly, possibly creating offset-charge stability at the timescale of minutes, which could be long enough for device calibration.

However, in the case of quasiparticle tunnelling, this has been shown here to have a harmful effect on circulation. Quasiparticles stochastically tunnel across the circulator junctions creating four accessible quasiparticle sectors in each of the total parity sectors. Under the same working parameters, each sector circulates signals differently with different circulation direction and different efficiency, which subsequently renders the circulator performance unreliable. This process can occur on shorter time-scales, meaning calibration may not be effective in addressing the issue.

Figure 8A:
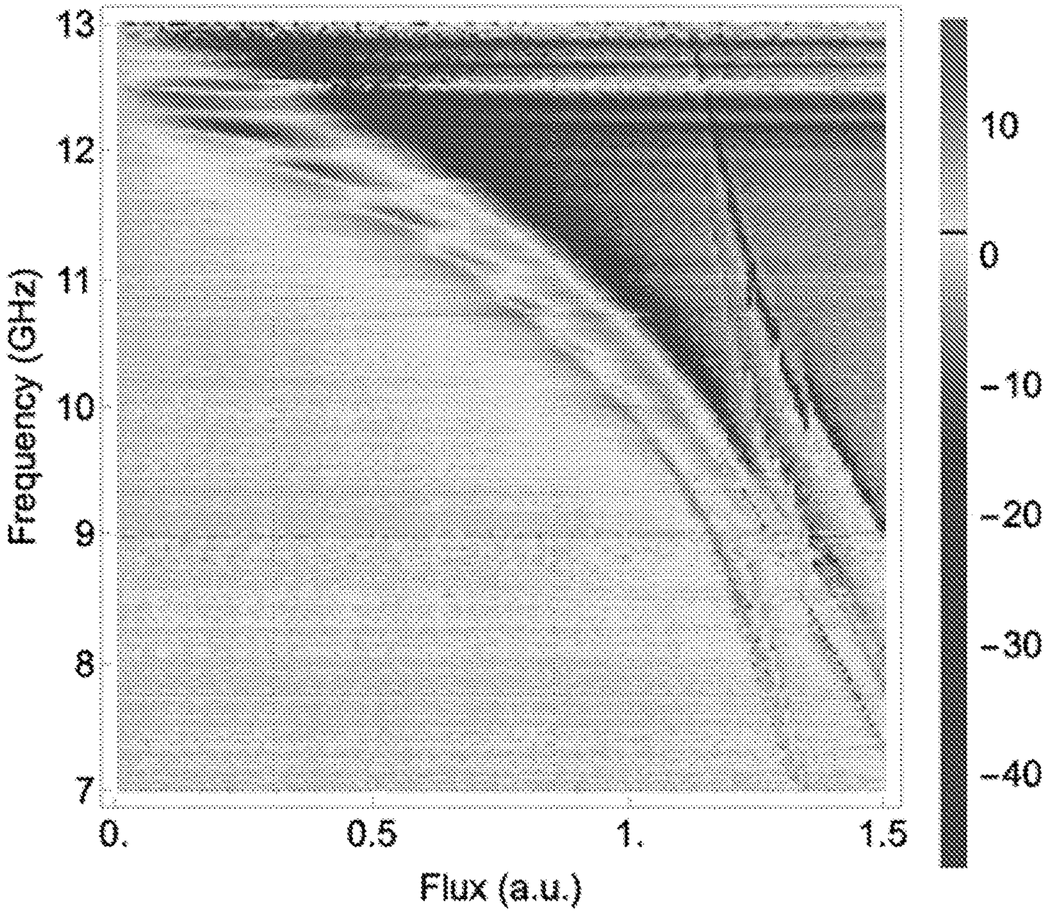
FIG. 8A is an image of an example of energy level measurements in a three junction circulator.
Figure 8B:
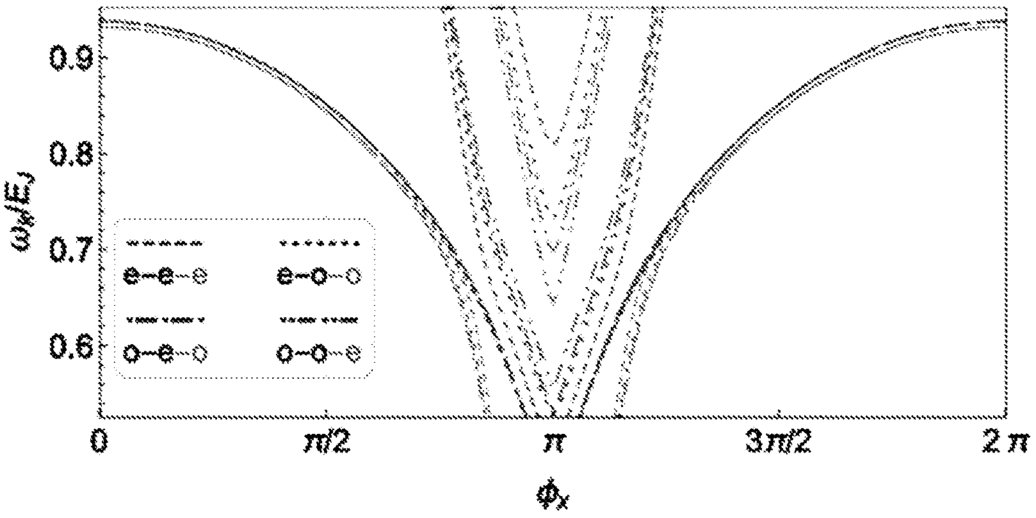
FIG. 8B is a graph of an example of the predicted spectrum in a three junction circulator.

An example of data demonstrating the impact of quasiparticles is shown in FIGS. 8A and 8B. In this example, experimental data was collected based on measurements performed in a three junction circulator, with the resulting measured energy levels being shown in FIG. 8A. FIG. 8B is a comparative theory plot of the predicted spectrum in the presence of quasiparticles. Comparison demonstrates a high level of qualitative agreement, demonstrating the presence of quasi-particles within the circulator.

Figure 8C:
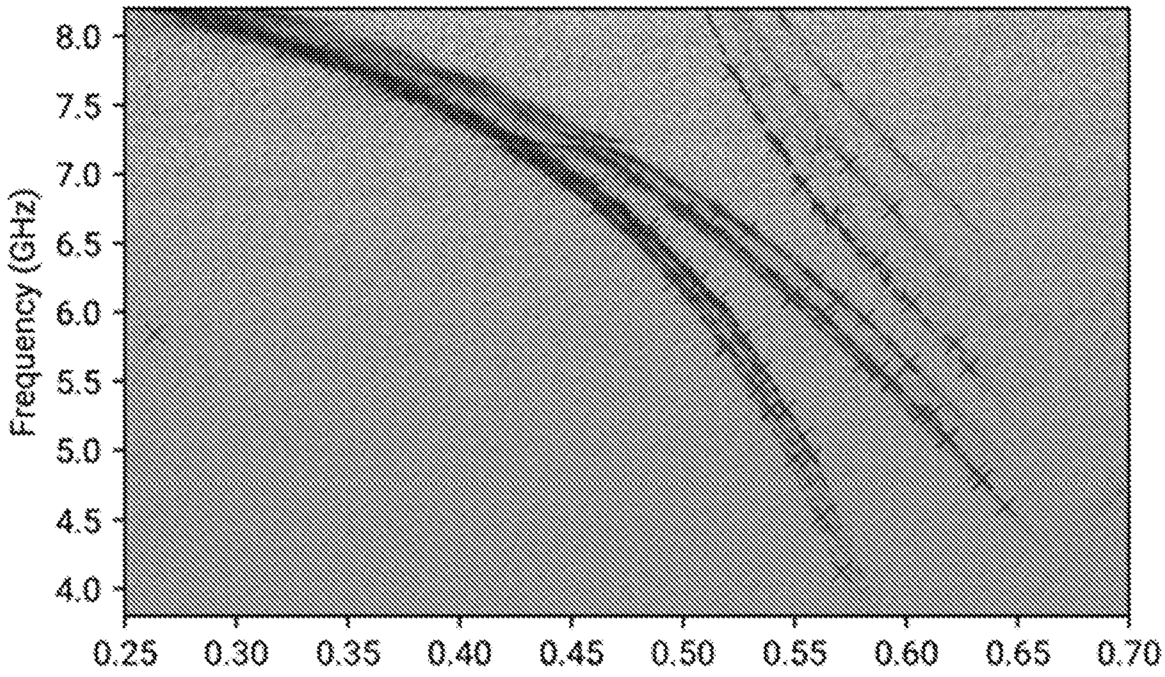
FIG. 8C is an image of a further example of energy level measurements in a three junction circulator.
Figure 8D:
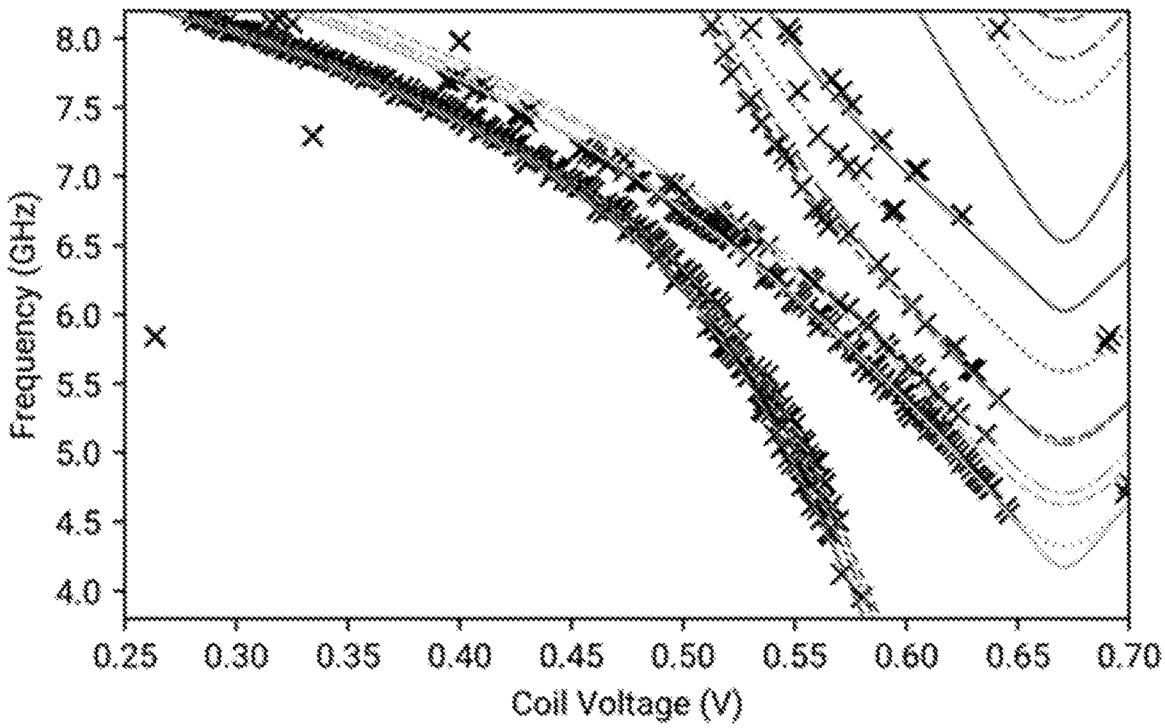
FIG. 8D is a graph of a further example of the predicted spectrum in a three junction circulator.

Further similar experimental data is shown in FIGS. 8C and 8D.

In this example, FIG. 8C shows raw data, where every measurement point for each frequency and magnetic bias was taken as a minimum of 100 fast reflection measurements (each taken within 100 μs). The fast reflection measurement is capable of resolving spectral lines corresponding to all the four different quasiparticle configurations. In this regard, the measurement is faster than the quasiparticle tunneling rate so that every point is measured predominantly during one quasiparticle configuration. Second, taking only the minimum of the reflected signal allows all the lines to be visualised with the same weight (unlike the slow measurement where the lines intensity are weighted with the probability of the system to occupy a particular parity configuration).

In FIG. 8C, crosses are used to show the locations of detected features in the data, noting that only a subset of the detected features are shown in this plot for clarity. FIG. 8D shows the feature crosses from the data, along with the predicted model fits.

The result is effectively a combination of the data and modelling in FIGS. 8A and 8B, which demonstrates high fidelity agreement between the model and the experiment, and particularly that the solid lines in FIG. 8D align with the features that are extracted from the data. Moreover, reflection resonant with each of the lines drops to 20%, which indicates that quasiparticle tunneling is the dominant sources of noise in the device.

One promising approach to mitigating this undesired effect is to use quasiparticle-trapping techniques such as normal metal traps and gap engineering to suppress quasiparticle population.

Gap engineering typically involves structuring the junctions so that energy gaps on either side of the junction are different, which in turn supresses quasiparticle tunnelling across the junction, as quasiparticles will have different energies on either side of the junction.

An example of manufacturing a gap engineered junction will now be described with reference to FIGS. 9, 10A and 10B.

Figure 9:
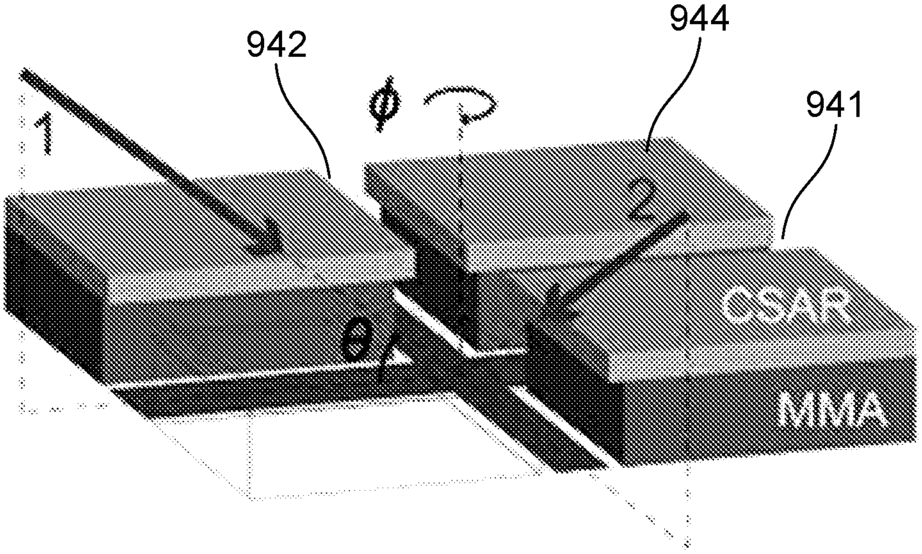
FIG. 9 is a schematic diagram of an example of a Josephson junction manufactured using shadow etching.

In this example, gap engineering is achieved using different thicknesses of superconducting materials using a “Manhattan” style shadow evaporation process, shown in FIG. 9. In this approach a mask for deposition of metal is formed by narrow perpendicular trenches 941, 942 in a thick resist layer 944. The evaporation angle θ is chosen to be very acute relative to the surface plane and can be oriented along one of the trenches through appropriate selection of angle ϕ. In this case, only the metal evaporated along one of the trenches will be deposited to the substrate, whilst for the trench which is perpendicular to the direction of the evaporation the metal will not reach the bottom of the trench and will be deposited on the wall of the trench. Thus, evaporation aligned with arrow 1 results in deposition in trench 941, whereas evaporation aligned with arrow 2 results in deposition in trench 942.

Later on the resist 944 will be removed together with the metal so that only the metal which was evaporated directly to the substrate remains. By choosing different thickness of metal at the two evaporation steps it is possible to form a Josephson junction where two electrodes have different thickness.

Figure 10A:
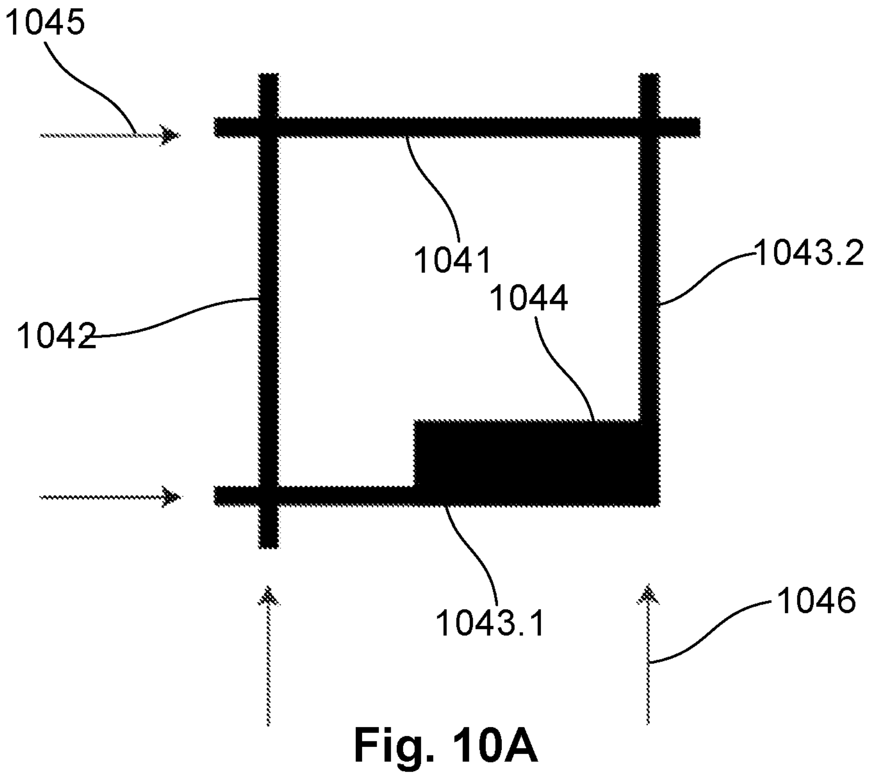
FIG. 10A is a schematic diagram of an example of a mask for manufacturing a microwave circulator using shadow etching.
Figure 10B:
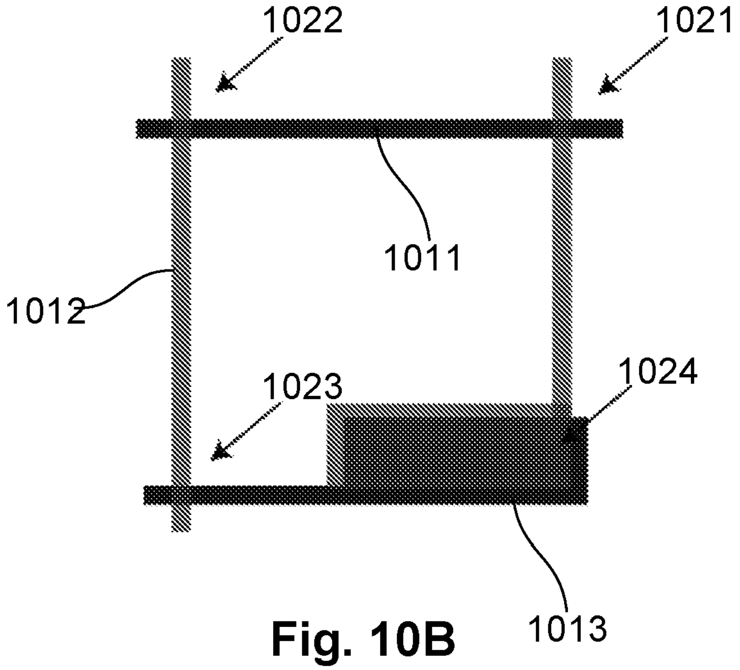
FIG. 10B is a schematic diagram of an example of a microwave circulator manufactured using the mask of FIG. 10A.

An example of a mask to deposit a circulator is shown in FIG. 10A, with the resulting circulator structure being shown in FIG. 10B. In this example, microwave ports are not shown for clarity.

In this example, the mask includes pairs of parallel orthogonal trenches 1041, 1043.1; 1042, 1043.2, in a square formation, with aluminium layers being deposited parallel to the trenches in the directions of arrows 1045, 1046 to form first and second superconducting layers. Specifically, a first layer is deposited in the direction of arrows 1045, after which the aluminium is oxidized to create a tunnel barrier, before a second layer is deposited in the direction of arrows 1046, resulting in the production of the circulator ring structure shown in FIG. 10B.

Thus, the trenches 1041, 1042, 1043.1, 1043.2 create the ring segments 1011, 1012, 1013, joined by four Josephson junctions 1021, 1022, 1023, 1024. In this instance, junction 1024 is much larger than the other junctions 1021, 1022, 1023 and hence does not play any role in the dynamics of the system, so that the two trenches 1043.1, 1043.2 form single ring segment 1013. Since two layers can be deposited with different thicknesses (such as 20 nm and 60 nm) each Josephson junction is formed by the electrodes of different thickness.

In another example, quasiparticle traps can be used to protect the circuit from quasiparticle tunnelling. In one example, the quasiparticle traps are made of patches of superconducting materials with a lower energy gap. For example, if superconducting aluminium has a gap of 1.2K then the gap for the quasiparticle traps can be around 0.5 K. This gap is still much higher than $k_B T$ at 20 mK temperature, thus the traps will be superconductive but the quasiparticles, once they diffuse into that area, would not be able to penetrate aluminium layer, meaning quasiparticles are preferentially retained in the particle traps.

Figure 11A:
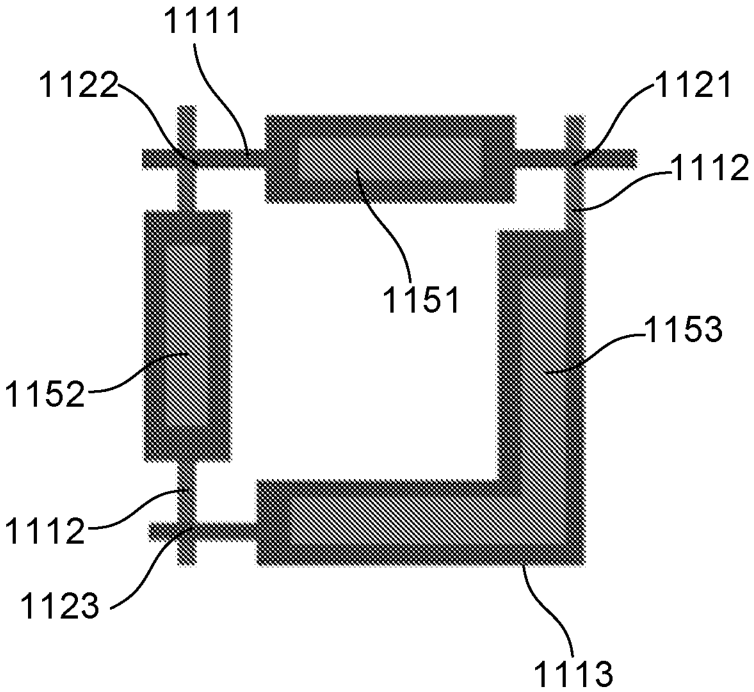
FIG. 11A is a schematic diagram of an example of a microwave circulator including quasiparticle traps; and, FIG. 11B is a schematic diagram of a further example of a microwave circulator including quasiparticle traps.

The quasiparticle traps can be deposited to the top of the circulator ring in a separate lithography step and an example of this is shown in FIG. 11A.

In this example, the circulator ring includes ring segments 1111, 1112, 1113, with interconnecting junctions 1121, 1122, 1123. In this example, the ring segments and junctions can be made using any manufacturing technique, including but not limited to the “Manhattan” described above. Additionally, in this example, quasiparticle traps 1151, 1152, 1153 are deposited on the ring segments 1111, 1112, 1113, as shown.

Figure 11B:
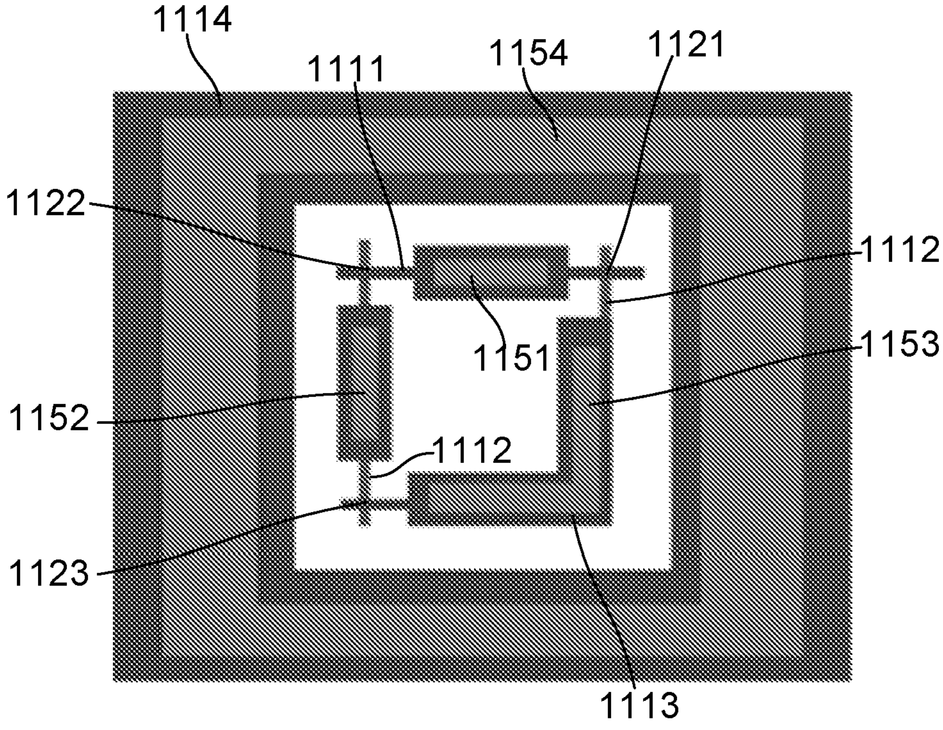

Additionally, quasiparticles can be created by absorbing gamma (or other types) radiation quanta in the substrate. Such events create bursts of high energy phonons which propagate in the substrate material and create quasiparticles in the superconductor. It is thus beneficial to create extra quasiparticle traps around the circulator, for example, in the ground planes as shown in FIG. 11B. In this case, the high energy phonons will be absorbed even before they reach the circulator and will diffuse into the lower gap quasiparticle trap material and can, in principle, recombine and emit phonons back to the substrate. However, those phonons will have lower energy and will not be able to create quasiparticles in the main superconductor anymore. Alternatively, instead of depositing traps on top of the higher gap superconductor the ground plane can be just formed by the lower gap superconductor.

Preliminary experiment results report that gap-engineered circulator samples exhibit no mixture of the quasiparticle-sector spectra for several hours, potentially manifesting strongly suppressed quasiparticle tunnelling events, resulting in more reliable circulator operation.

Throughout this specification and claims which follow, unless the context requires otherwise, the word “comprise”, and variations such as “comprises” or “comprising”, will be understood to imply the inclusion of a stated integer or group of integers or steps but not the exclusion of any other integer or group of integers.

Persons skilled in the art will appreciate that numerous variations and modifications will become apparent. All such variations and modifications which become apparent to persons skilled in the art, should be considered to fall within the spirit and scope that the invention broadly appearing before described.

The claims defining the invention are as follows:

1. A microwave circulator including an integrated circuit and having:

a) a number of ports;

b) a respective superconducting ring segment coupled to each port to allow microwave frequency signals to be transferred between the port and the respective ring segment;

c) a superconducting tunnel junction interconnecting each pair of adjacent ring segments to form a circulator ring, wherein the tunnel junctions are configured so that when a bias is applied to the tunnel junctions, signals undergo a phase shift as they traverse the tunnel junctions between ring segments, thereby propagating signals to an adjacent port in a propagation direction; and, d) at least one feature to at least partially suppress quasiparticles within the circulator, wherein the at least one feature includes trap superconducting material deposited on each of the ring segments.

2. A microwave circulator according to claim 1, wherein the at least one feature includes gap engineering of one or more of the tunnel junctions.

3. A microwave circulator according to claim 2, wherein each tunnel junction includes superconducting electrodes separated by a tunnelling barrier, and wherein at least one of:

a) the electrodes have different thicknesses; and, b) the electrodes are made of different superconducting materials.

4. A microwave circulator according to claim 1, wherein at least one of:

a) the propagation direction is dependent on at least one of a magnitude and polarity of the bias;

b) propagation is controlled by adjusting at least one of a magnitude and polarity of the bias; and, c) propagation is controlled so that circulator acts as at least one of:

i) a switch;

ii) an isolator;

iii) a duplexer;

iv) a filter; and, v) an attenuator.

5. A microwave circulator according to claim 1, wherein the bias includes:

a) a central bias applied to all of the tunnel junctions; and, b) a segment bias applied to tunnel junctions between each ring segment.

6. A microwave circulator according to claim 5, wherein the bias includes:

a) the central bias generated by applying a magnetic field to the ring; and, b) the segment bias generated by applying a bias voltage to each ring segment.

7. A microwave circulator according to claim 1, wherein each port is capacitively coupled to a respective ring segment.

8. A microwave circulator according to claim 1, wherein the tunnel junctions are Josephson junctions.

9. A microwave circulator according to claim 1, wherein the integrated circuit includes:

a) a substrate;

b) a first superconducting material deposited on the substrate that is to form a lower electrode of each junction;

c) an insulating layer provided on at least part of a first conductive material that forms tunnelling barrier of the junctions; and, d) a second superconducting material deposited on the insulating layer and spanning adjacent lower electrodes to form counter electrodes of each junction.

10. A microwave circulator according to claim 9, wherein at least one of:

a) the first and second superconducting materials are made of at least one of:

i) niobium; and, ii) aluminium; and, b) the insulating layer is made of aluminium oxide.

11. A microwave circulator according to claim 1, wherein the circulator includes at least three of the ports and three of the ring segments.

* * * * *